(12) United States Patent
Prakash et al.

(10) Patent No.: US 8,023,719 B2
(45) Date of Patent: Sep. 20, 2011

(54) MICR READER USING PHASE ANGLE EXTRACTED FROM FREQUENCY DOMAIN ANALYSIS

(75) Inventors: Ravinder Prakash, Concord, NC (US); Jerry J. Zacharias, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1070 days.

(21) Appl. No.: 11/839,160

(22) Filed: Aug. 15, 2007

(65) Prior Publication Data
US 2009/0046919 A1 Feb. 19, 2009

(51) Int. Cl.
*G06K 9/00* (2006.01)

(52) U.S. Cl. ........ 382/139; 382/140; 382/181; 382/276; 382/280

(58) Field of Classification Search .................. 382/139, 382/140, 181, 276, 280
See application file for complete search history.

(56) References Cited

U.S. PATENT DOCUMENTS

| | | | | |
|---|---|---|---|---|
| 3,624,605 A | | 11/1971 | Aagard | |
| 4,454,610 A | * | 6/1984 | Sziklai | 382/119 |
| 4,764,973 A | * | 8/1988 | O'Hair | 382/229 |
| 4,817,176 A | * | 3/1989 | Marshall et al. | 382/280 |
| 5,369,670 A | | 11/1994 | Zagloul et al. | |
| 5,504,318 A | * | 4/1996 | Joseph et al. | 235/454 |
| 5,684,890 A | | 11/1997 | Miyashita et al. | |
| 6,373,970 B1 | | 4/2002 | Dong et al. | |
| 6,421,457 B1 | * | 7/2002 | Su | 382/149 |
| 6,687,422 B1 | | 2/2004 | Chen et al. | |
| 7,124,130 B2 | | 10/2006 | Natori | |
| 7,796,798 B2 | * | 9/2010 | Prakash | 382/139 |
| 2006/0039580 A1 | * | 2/2006 | Moon et al. | 382/100 |

* cited by examiner

*Primary Examiner* — Wesley Tucker
(74) *Attorney, Agent, or Firm* — Douglas Lashmit; Hoffman Warnick LLC

(57) ABSTRACT

A system and method for implementing phase angle based magnetic ink character recognition (MICR). A system is provided that includes: a segmentation system for segmenting inputted MICR data into sets of temporal data for inputted characters; a Fourier system for generating a set of phase angle components from temporal data for each inputted character; and a matching system for comparing the normalized set of phase angle components with each of a set of reference waveforms to determine an identity of the inputted character.

14 Claims, 5 Drawing Sheets

MICR READER USING PHASE ANGLE EXTRACTED FROM FREQUENCY DOMAIN ANALYSIS

FIELD OF THE INVENTION

The invention relates generally to MICR (magnetic ink character recognition), and more particularly, to a system and method for implementing a frequency domain based MICR reader using phase angle.

BACKGROUND OF THE INVENTION

MICR (magnetic ink character recognition) technology is commonly deployed by banks and other financial institutions for reading code line character data, such as account and routing information typically found on bank checks. Because MICR utilizes magnetic, as opposed to optical, information to read character data, MICR readers are generally immune to visual noise.

Single gap MICR readers, which are vastly popular in check processing applications, utilize technology that transduces characters based on temporal signals from a single gap magnetic read-head. Such readers typically implement refined signal processing to improve the accuracy of the read. However, such systems are still vulnerable to noise that can interfere with their character discrimination capabilities.

U.S. patent application Ser. No. 11/383,859, entitled FREQUENCY DOMAIN BASED MICR READER, which is hereby incorporated by reference, discloses a system in which the amplitude of Fourier components are used to identify MICR characters. However, additional techniques for performing this task could lead to even more robust processes. Accordingly, a need exists for a system and method that provides improved read capabilities for a MICR reader.

SUMMARY OF THE INVENTION

The present invention addresses the above-mentioned problems, as well as others, by providing a system and method for implementing a frequency domain based MICR reader that utilizes phase angle to identify MICR characters.

In a first aspect, the invention provides a phase angle based magnetic ink character recognition (MICR) system, comprising: a segmentation system for segmenting inputted MICR data into sets of temporal data for different inputted characters; a Fourier system for generating a set of phase angle components from the temporal data for each segmented character; and a matching system for comparing the set of phase angle components with each of a set of reference waveforms to determine an identity of the inputted character.

In a second aspect, the invention provides a computer program product stored on a computer readable medium for implementing a phase angle based magnetic ink character recognition (MICR) system, comprising: program code for segmenting inputted MICR data into sets of temporal data for different inputted characters; program code for generating a set of phase angle components from a Fourier transform of the temporal data for each segmented character; and program code for comparing the set of phase angle components with each of a set of reference waveforms to determine an identity of the inputted character.

In a third aspect, the invention provides a method of implementing a phase angle based magnetic ink character recognition (MICR) system, comprising: generating a set of phase angle components from a Fourier transform of temporal MICR data for an inputted arbitrary character; and comparing the phase angle components with each of a set of reference waveforms to determine an identity of the inputted arbitrary character.

Accordingly, by analyzing the Fourier phase angle components, an arbitrary character can be read by correlating the magnitude of the Fourier phase angle components to reference waveforms. This approach offers automatic noise immunity since any noise is typically found in the higher frequencies which can be easily filtered out. Note that for the purposes of this disclosure, the term "reference waveform" refers to a "set of reference Fourier phase angle components."

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
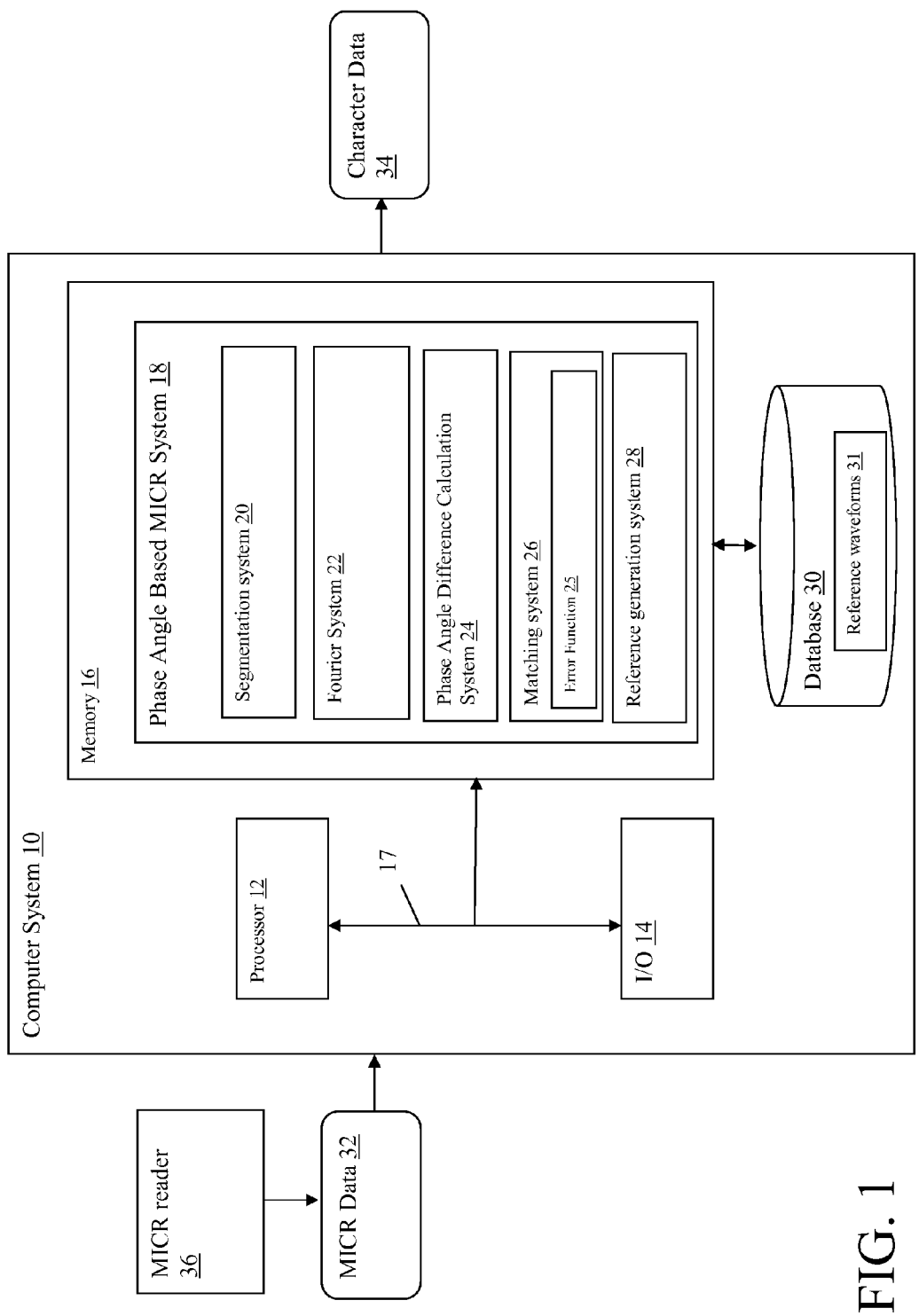
FIG. 1 depicts a phase angle based MICR reader system in accordance with an embodiment of the present invention.
Figure 2:
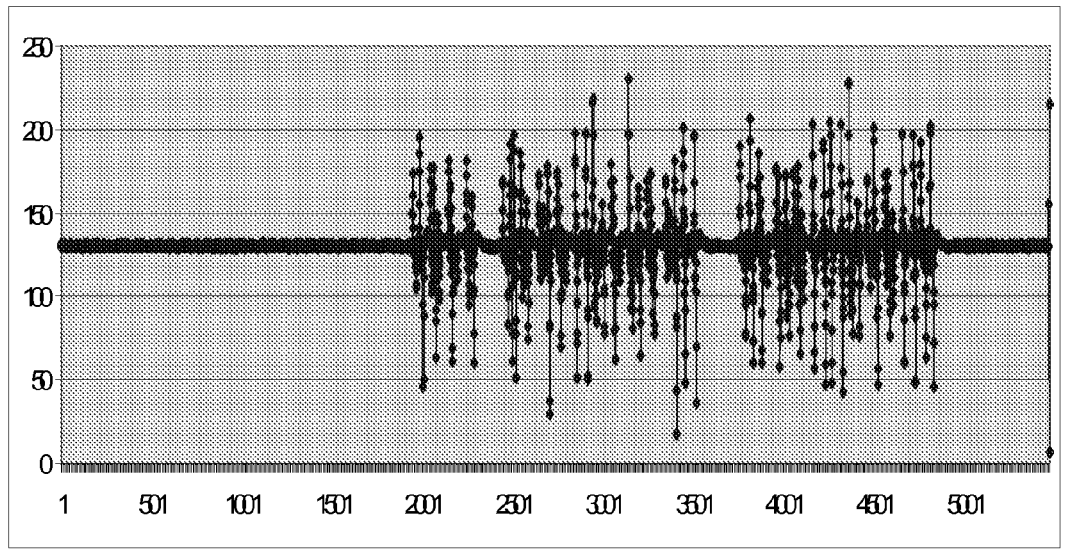
FIG. 2 depicts a typical MICR signal in the temporal domain.
Figure 3:
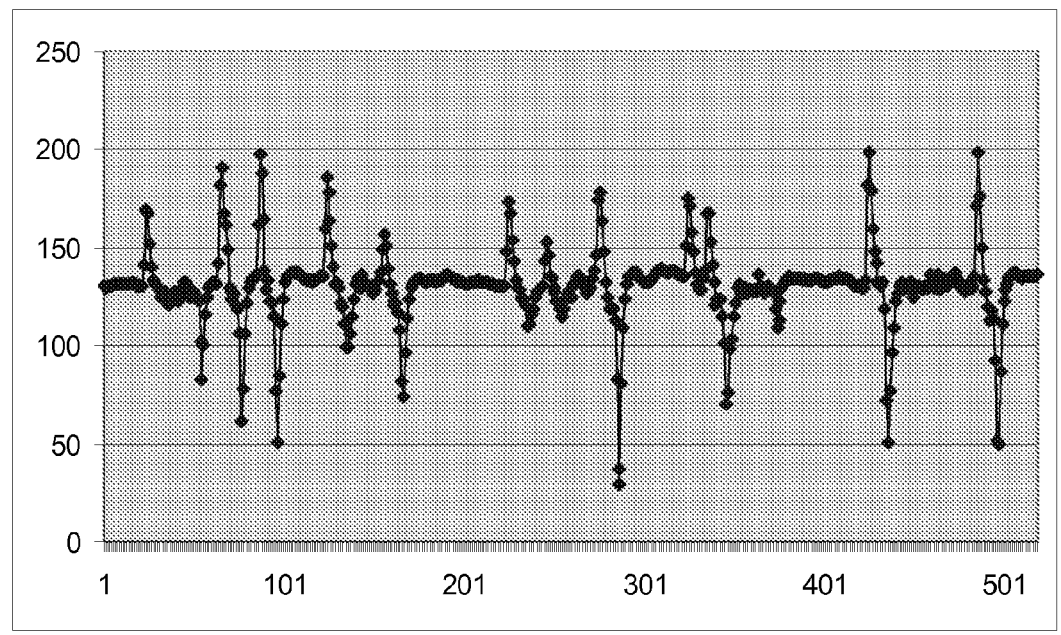
FIG. 3 depicts an expanded view of a portion of the MICR signal of FIG. 2 showing five characters.

Referring now to the drawings, FIG. 1 depicts a computer system 10 having a phase angle based MICR system 18 that processes inputted MICR data 32 and generates recognized character data 34. MICR data 32 generally includes temporal waveform signals obtained from a MICR reader 36 that reads characters printed with magnetic ink, such as those found on the code line of a bank check. For instance, in the case of a single gap MICR reader, magnetic data is collected as the "gap" passes over the code line. In one common, but not limiting, application, code lines are printed using 14 possible characters (0-9 and four special characters) in E13B font. FIG. 2 depicts an example of a temporal waveform obtained from a MICR reader 36 from of a sample bank check having 27 characters in the code line. FIG. 3 depicts a segmented waveform view of the first five characters from the waveform of FIG. 2.

Rather than analyze the waveform data in the temporal domain to perform character recognition, the present invention converts the MICR data 32 into the frequency domain and analyzes the phase angle to perform character recognition. To achieve this, phase angle based MICR system 18 (FIG. 1) includes: a segmentation system 20 that segments the temporal MICR data 32 into individual character data; a Fourier system 22 that converts the individual character data into phase angles for a predetermined set of harmonics; a phase angle difference calculation system 24 that calculates a phase angle difference between harmonics; a matching system 26 that compares the phase angle data with a set of reference waveforms 31 representative of a set of possible characters; and a reference generation system 28 for generating the set of reference waveforms 31.

Figure 4:
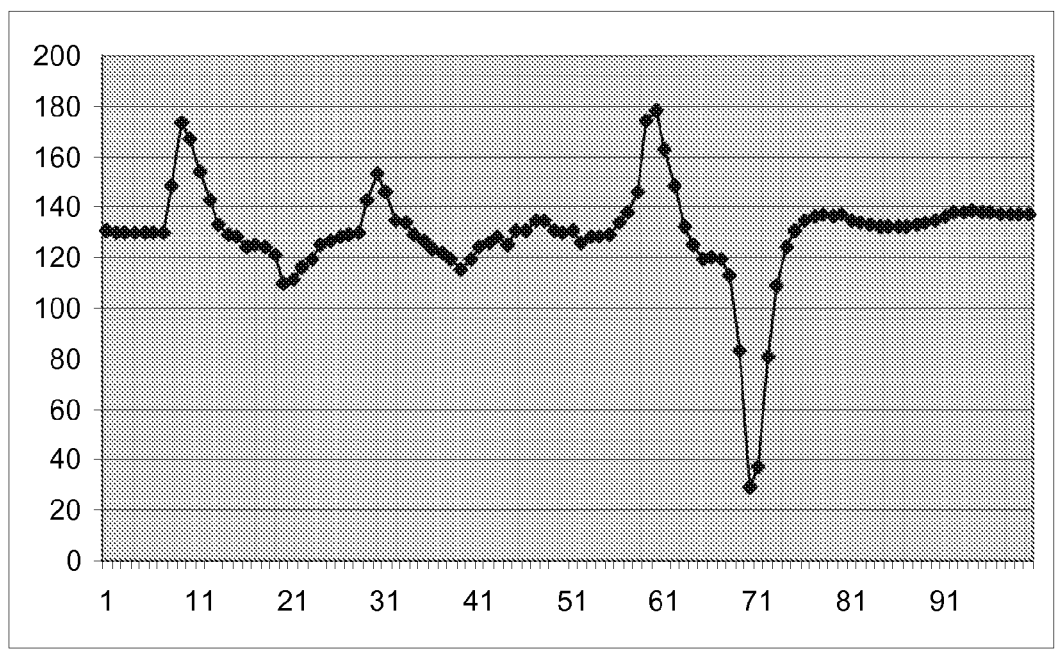
FIG. 4 depicts an expanded view of a portion of the MICR signal of FIG. 2 showing one character.
Figure 5:
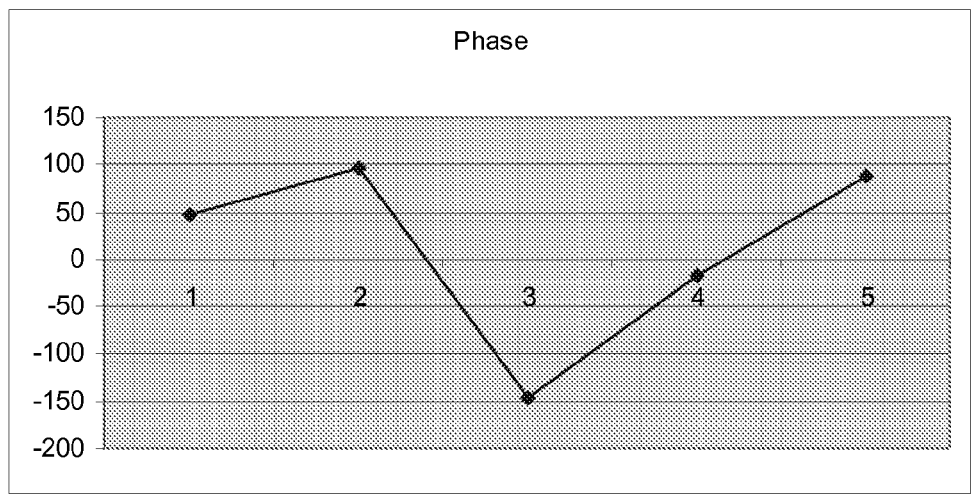
FIG. 5 depicts a waveform of a single character broken down into a set of Fourier phase angle components in accordance with an embodiment of the present invention.

FIG. 4 depicts the segmented waveform for a single character after being read by the MICR reader 36 and segmented by segmentation system 20. Note that the segmentation is such that it starts at the first eight sample points before the first peak location. Next, Fourier system 22 computes a phase angle for each harmonic. In the example shown in FIGS. 5-7, the first five harmonics are utilized. However, it is understood that different, more or fewer harmonics could be utilized. Note also that any now known or later developed technique for segmenting the MICR data 32 and converting it to the frequency domain may be utilized. FIG. 5 depicts the phase angles (i.e., magnitudes) for each of the first five harmonics for the character "6".

As noted above with regard to FIG. 1, a reference generation system 28 is provided to generate a set of reference waveforms 31 (or "profiles") for each possible character. For instance, in the case of E13B there are 14 possible characters, so 14 different reference waveforms 31 would be required. The reference waveforms 31 would only need to be generated once and could for example be stored in database 30. In an alternative embodiment, the reference waveforms 31 could be obtained from a third party source, e.g., downloaded over a network. Regardless of how they are obtained, the reference waveforms 31 are ultimately used by matching system 26 to identify inputted (i.e., arbitrary) character waveforms.

Figure 6:
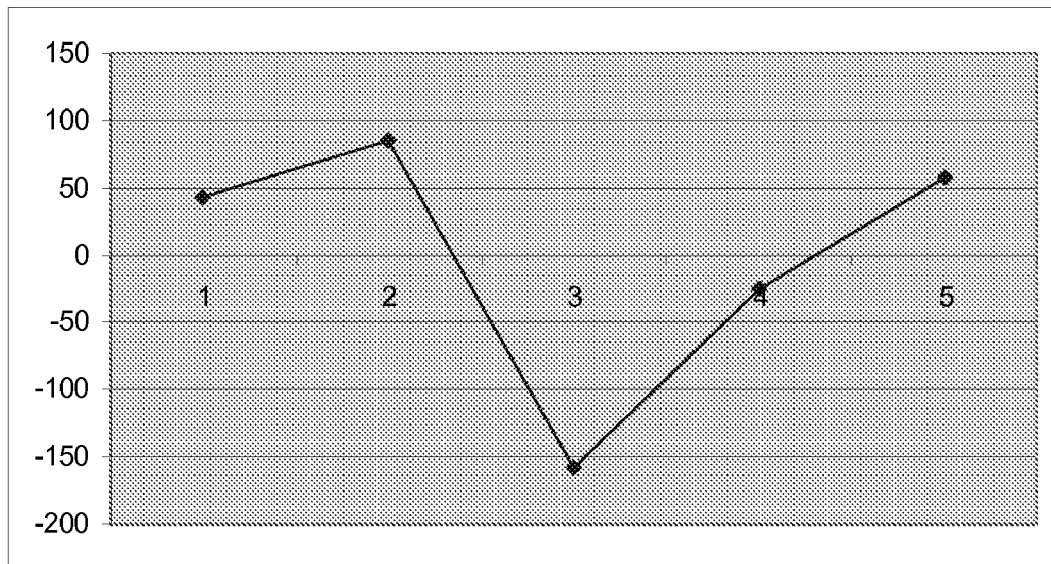
FIG. 6 depicts a resulting reference waveform for the character "6" generated in accordance with an embodiment of the present invention.

In one illustrative embodiment, each reference waveform 31 may be generated by taking an average of N sample waveforms collected for each character. For instance, FIG. 6 depicts a resulting reference waveform (also referred to herein as a "golden reference") for the first five harmonics of the character "6". Note its similarity to FIG. 5. Thus, in the case of E13B, 14 such golden references would be generated. These golden references could then be compared with an inputted character waveform (i.e., an arbitrary character's Fourier phase angle spectrum) by matching system 26 to determine the identity of the inputted character waveform. Thus, in the case of E13B, an inputted character waveform would be matched against each of the 14 possible reference waveforms 31. For instance, the first five Fourier phase angle components of the inputted character waveform would be compared to each of the five Fourier phase angle components of the 14 golden references.

Figure 7:
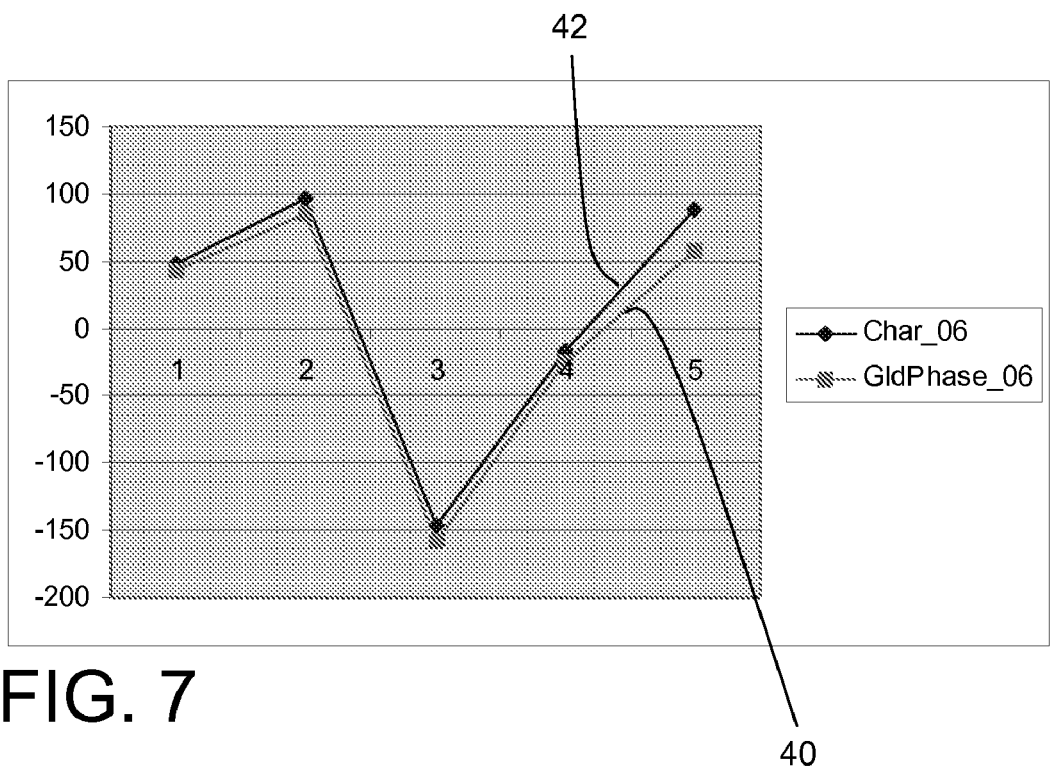
FIG. 7 depicts an inputted and reference waveform in accordance with an embodiment of the present invention.

In one illustrative methodology, matching system 26 finds a closest match by comparing the difference between the arbitrary character's phase angle spectrum and each golden reference. FIG. 7 depicts an example of such a comparison. In this case, a random character's waveform 42 is compared to the golden reference 40 of the character "6" to generate an error value. For instance, the error value may comprise a summation of the differences of the unknown character's phase angle with a known character's golden reference. It is understood that this is but one example of a pattern matching methodology, and any other now known or later developed methodology could be employed without departing from the scope of the invention. It should also be understood that while the invention is generally described with reference to a system and method for reading E13B data, the invention is not limited to any particular font or character set.

Figure 8:
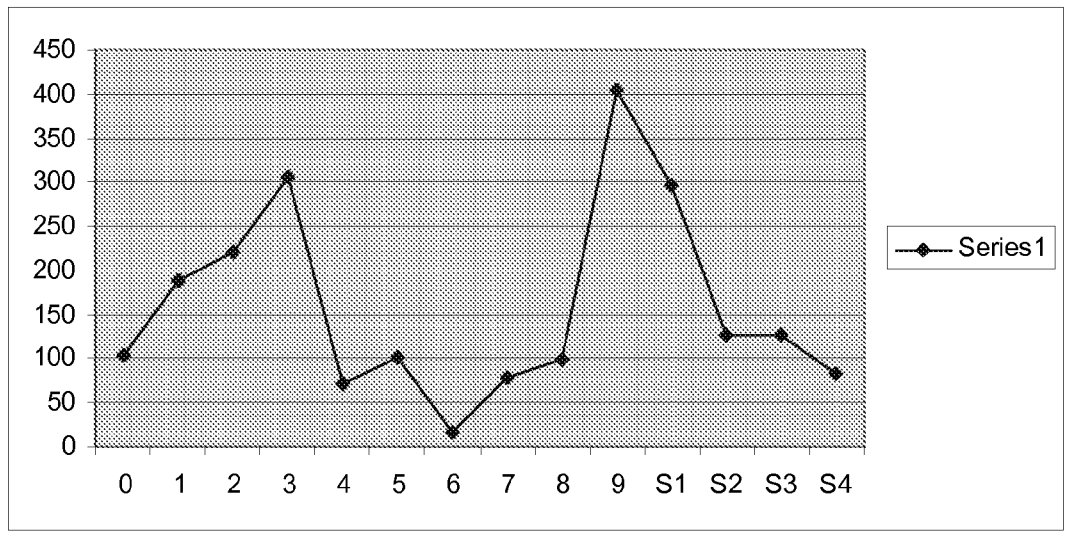
FIG. 8 depicts a plot of an error function for an inputted character and a known character set.

As noted, in the case of E13B, 14 different compare operations would be required to find a closest match since there are 14 possible characters. FIG. 8 depicts a resulting error function for an arbitrary character compared with 14 golden references. Note that the error function is normalized with respect to the number of contributing harmonics. As can be seen, of the 14 possible "matches," the error function is smallest for the character "6." Namely, the magnitude of the difference between the inputted characters and "6" is about 10, while the magnitude of the difference for the remaining 13 characters ranges from 60 to 400. Read rules can be readily established to offer best read rate and error rate performance.

Figure 9:
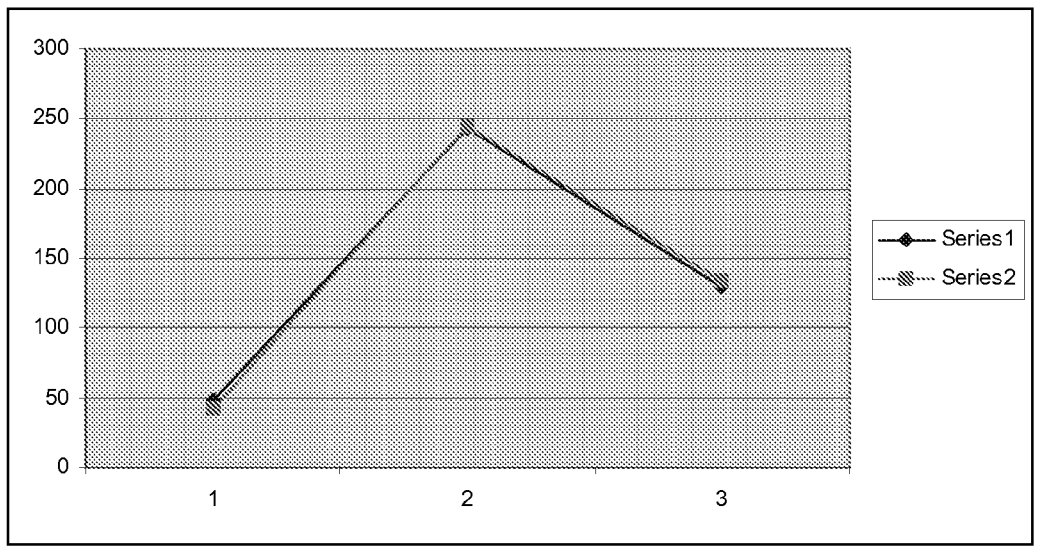
FIG. 9 depicts an inputted and reference waveform utilizing phase angle differences in accordance with an embodiment of the present invention.

As a further enhancement, rather than simply analyzing the magnitude of the phase angles at different harmonics, phase angle difference calculation system 24 may be employed to calculate phase angle differences between adjacent harmonics. For example, FIG. 9 depicts a graph in which three phase angle differences (Series 1) were calculated (e.g., between harmonics 1-2; 2-3; and 3-4) and plotted against a golden reference waveform of phase angle differences (Series 2). As can be seen, the difference between the two waveforms is relatively small and may provide a more stable result. This enhancement overcomes segmentation errors by analyzing relative phase angles.

Note that computer system 10 of FIG. 1 may comprise any type of computing system, and could be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a phase angle based MICR system 18 could be created, maintained and/or deployed by a service provider that offers the functions described herein for customers. That is, a service provider could offer to provide frequency based character recognition as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A phase angle based magnetic ink character recognition (MICR) system, comprising:
   a segmentation system for segmenting inputted MICR data into sets of temporal data for different inputted characters;
   a Fourier system for generating a set of phase angle components from the temporal data for each segmented character, wherein the set of phase angle components comprises a plurality of harmonics;
   a phase angle difference calculation system for calculating a phase angle difference between adjacent harmonics of the plurality of harmonics to generate a set of phase angle differences; and
   a matching system for comparing the set of phase angle differences with each of a set of reference waveforms to determine an identity of the inputted character.

2. The phase angle MICR system of claim 1, wherein the set of phase angle components comprises five harmonics including a fundamental and next four harmonics.

3. The phase angle MICR system of claim 1, wherein the matching system includes a reference waveform for each character in a character set.

4. The phase angle MICR system of claim 3, wherein the matching system calculates an error function comprising a difference between the phase angle differences and each reference waveform.

5. The phase angle MICR system of claim 1, further comprising a reference generation system for generating each of the reference waveforms.

6. A computer program product stored on a non-transitory computer readable medium for implementing a phase angle based magnetic ink character recognition (MICR) system, comprising program code for:
   segmenting inputted MICR data into sets of temporal data for different inputted characters;
   generating a set of phase angle components from a Fourier transform of the temporal data for each segmented character, wherein the set of phase angle components comprises a plurality of harmonics;
   calculating a phase angle difference between adjacent harmonics of the plurality of harmonics to generate a set of phase angle differences; and
   comparing the set of phase angle differences with each of a set of reference waveforms to determine an identity of the inputted character.

7. The computer program product of claim 6, wherein the set of phase angle components comprises five harmonics including a fundamental and next four harmonics.

8. The computer program product of claim 6, wherein the set of reference waveforms include a reference waveform for each character in a character set.

9. The computer program product of claim 6, further comprising program code for calculating an error function comprising a difference between the phase angle differences and each reference waveform.

10. The computer program product of claim 6, further comprising program code for generating each of the reference waveforms.

11. A method of implementing a phase angle based magnetic ink character recognition (MICR) system, comprising:
    generating a set of phase angle components from a Fourier transform of temporal MICR data for an inputted arbitrary character, wherein the set of phase angle components comprises a plurality of harmonics;
    calculating a phase angle difference between adjacent harmonics of the plurality of harmonics to generate a set of phase angle differences; and
    comparing the set of phase angle differences with each of a set of reference waveforms to determine an identity of the inputted arbitrary character.

12. The method of claim 11, further comprising:
    collecting MICR data from a single gap MICR reader; and
    segmenting collected MICR data into discrete sets of temporal data for individual characters.

13. The method of claim 11, wherein the set of phase angle components comprises five harmonics.

14. The method of claim 11, wherein a reference waveform is provided for each character in a character set.

* * * * *